Sept. 12, 1967          D. R. BOWES          3,341,066
APPARATUS AND PACKAGE FOR DISPENSING STERILE OBJECTS
Filed July 13, 1965          8 Sheets-Sheet 1
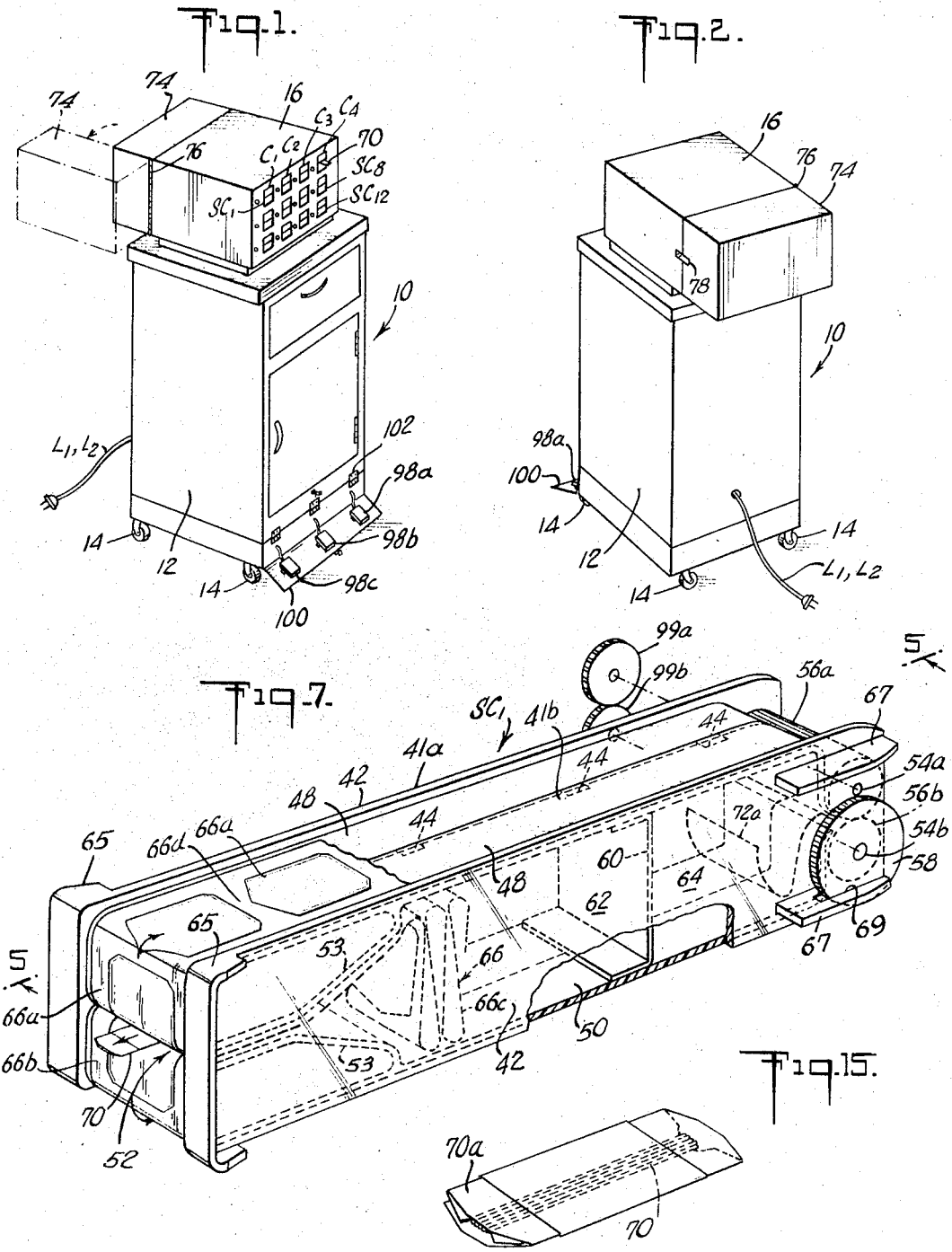
INVENTOR.
DONALD R. BOWES

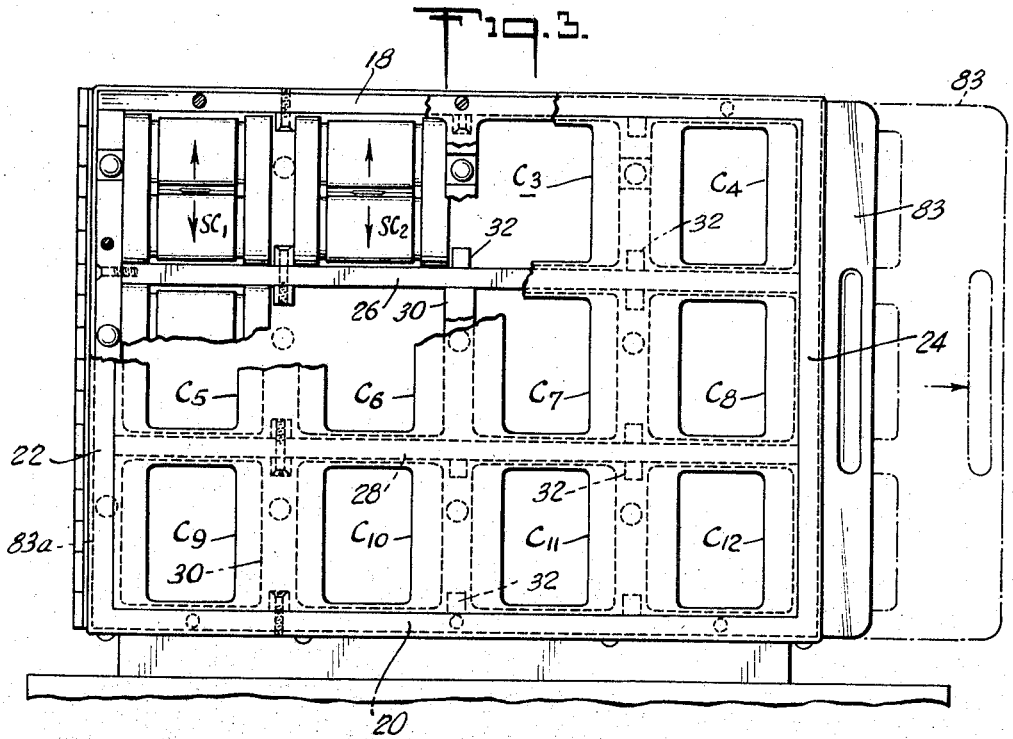
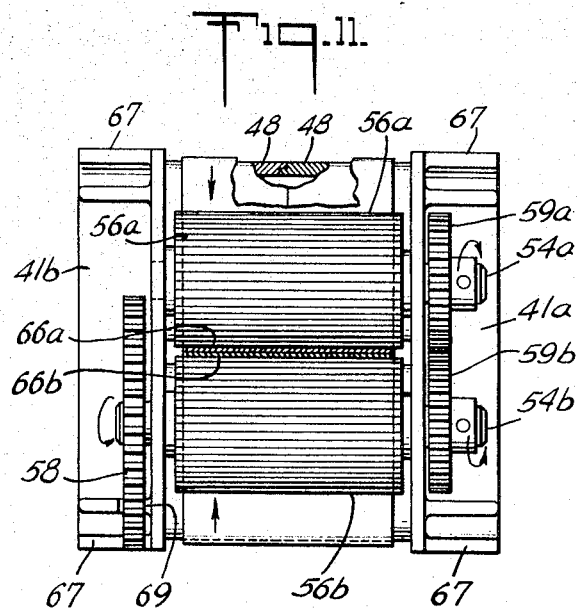

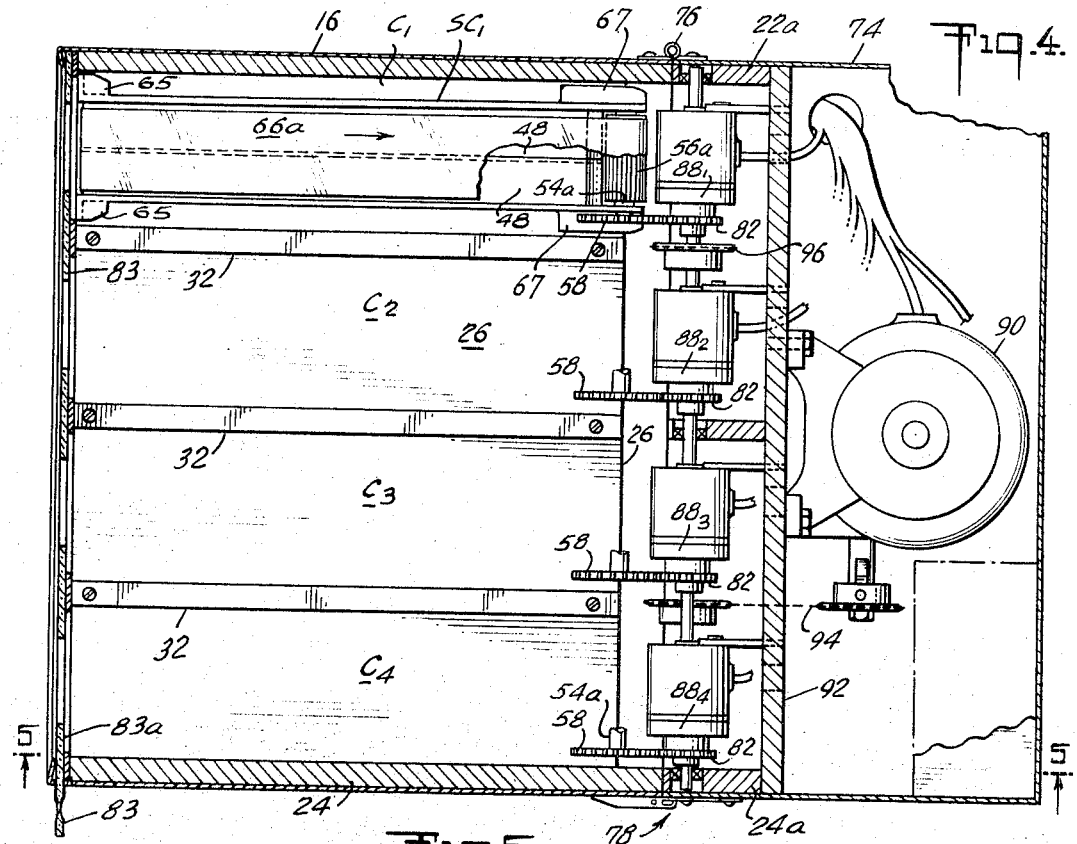
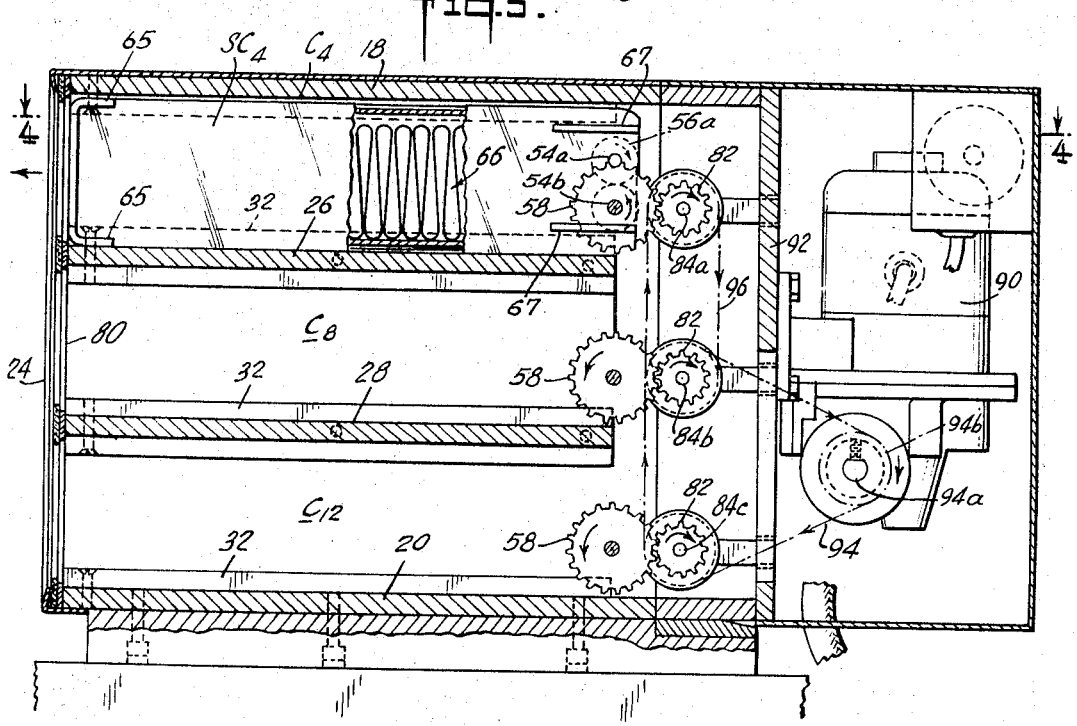

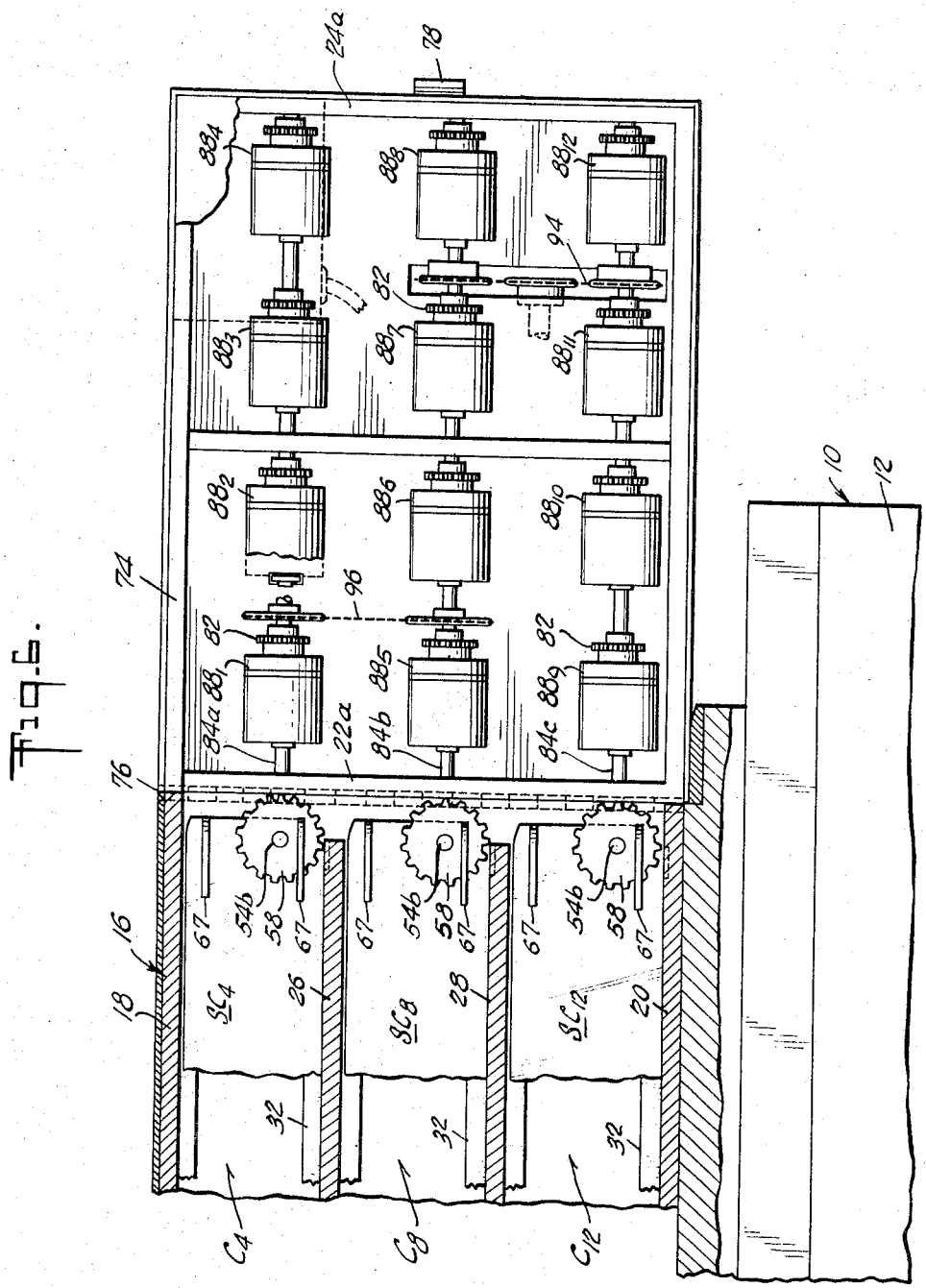

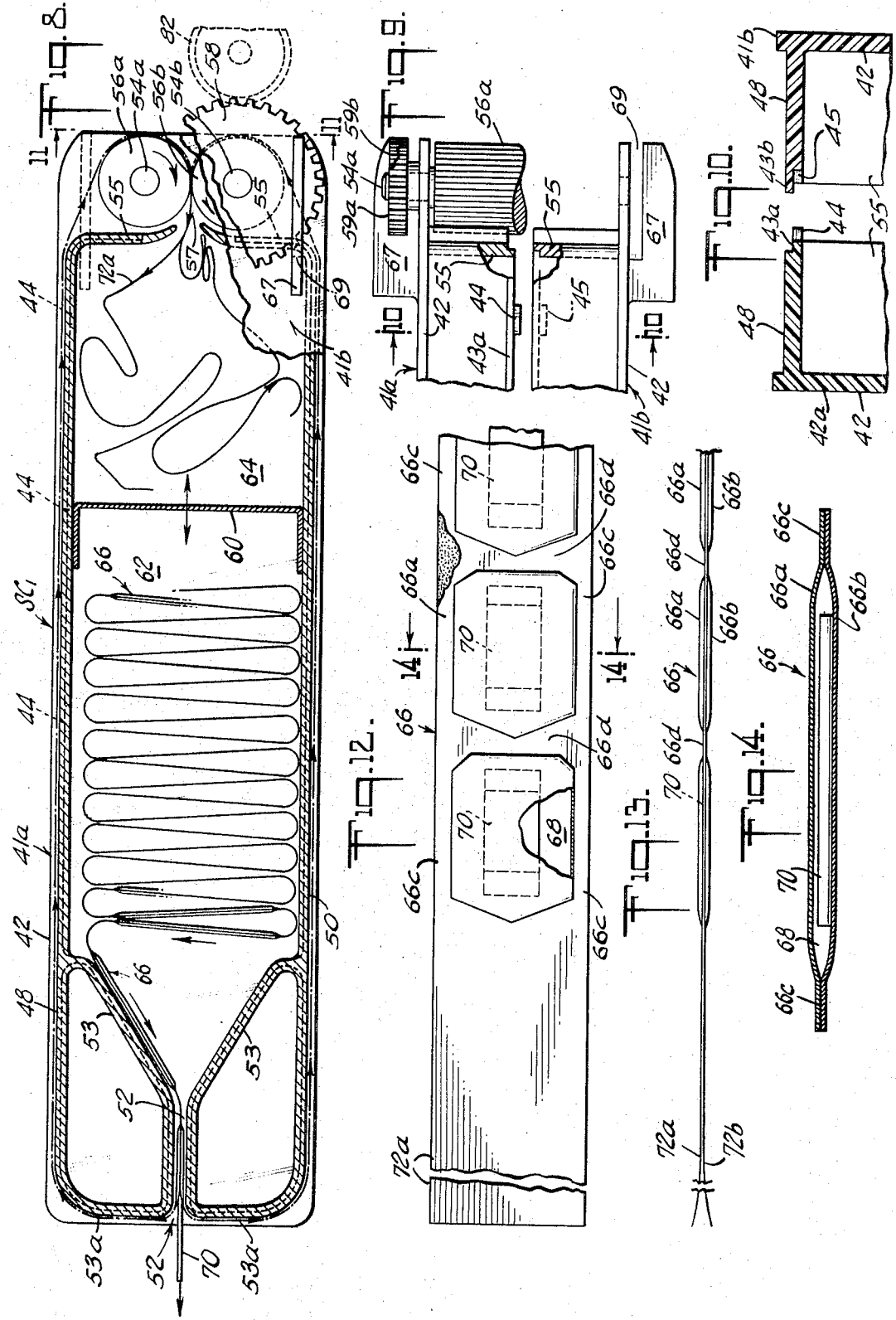

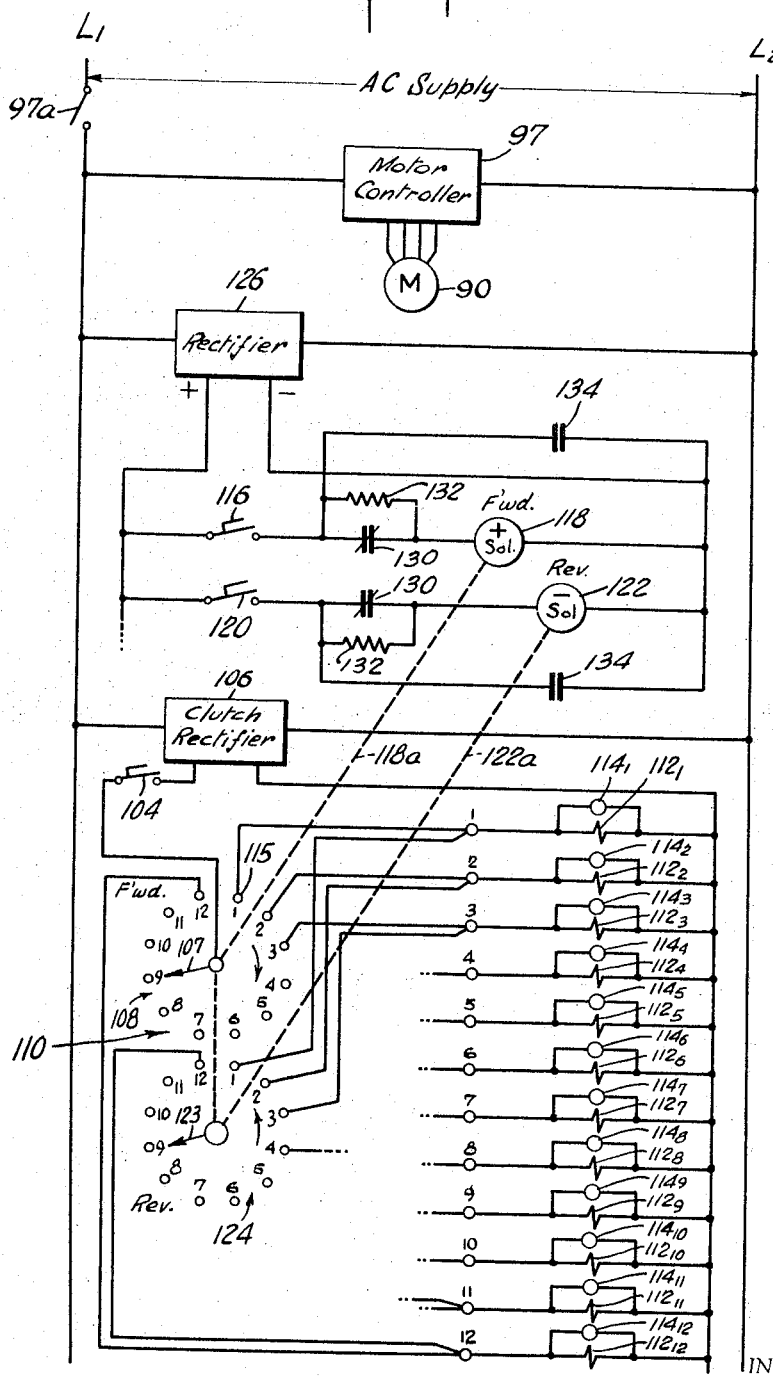

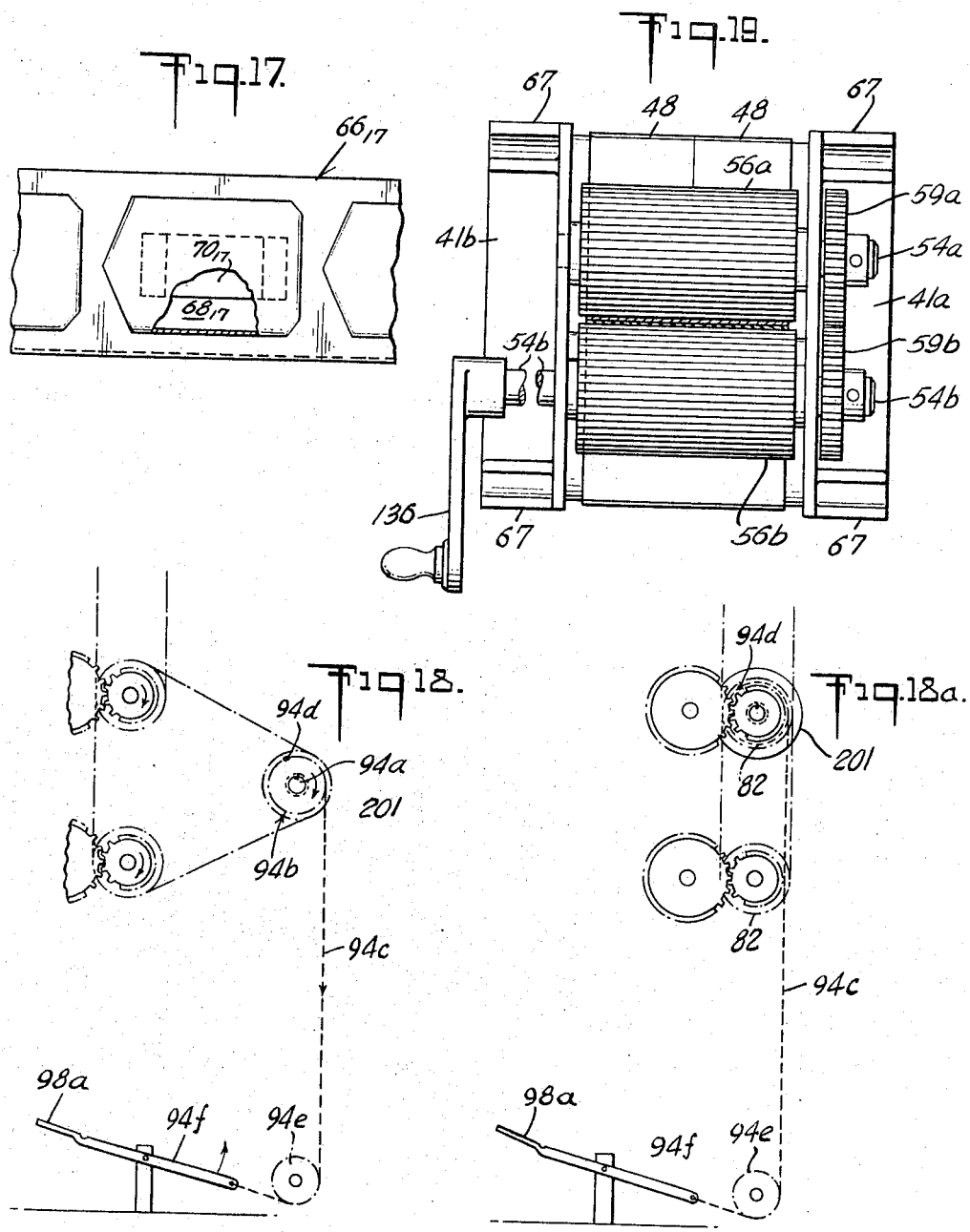

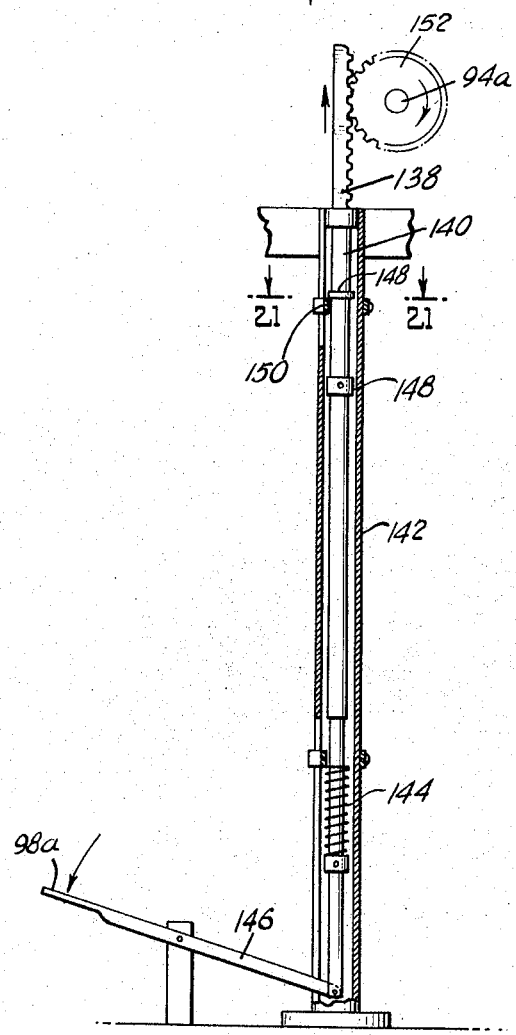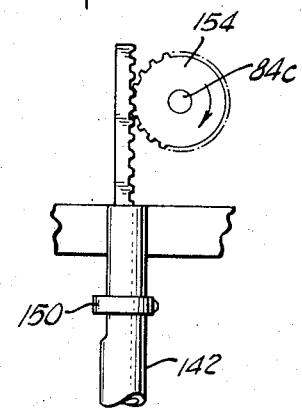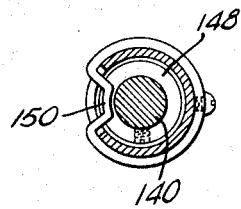

United States Patent Office 3,341,066
Patented Sept. 12, 1967

3,341,066
APPARATUS AND PACKAGE FOR DISPENSING STERILE OBJECTS
Donald R. Bowes, Fanwood, N.J., assignor to Ethicon, Inc., a corporation of New Jersey
Filed July 13, 1965, Ser. No. 471,700
15 Claims. (Cl. 221—25)

The present invention relates to apparatus for the dispensing of packaged articles and, more particularly, to apparatus for dispensing packaged sterile objects, such as sterile sutures, sterile gloves, and the like.

Heretofore, sterile objects, such as sterile sutures, have been individually packaged for use in the operating room. Each suture is hermetically and peripherally sealed between two strips (or a folded strip) of a flexible material, such as thin aluminum foil, to form the inner pack. Thereafter, the inner pack is sealed in a transparent envelope type outer pack by means of an adhesive or an adhesive strip. The outer packs are then assembled into a shipping container and subjected to sterilization by conventional means, such as cobalt radiation.

In order to prepare the individual sterile suture for use in a sterile operating room, the circulating nurse opens the outer pack and presents the sterile inner pack to the sterile nurse, which sterile nurse tears off one end of the sterile inner pack, separates the two webs to expose the sterile suture, and the ejects or drops such sterile suture on the sterile table adjacent the sterile operating table. This conventional manual procedure expends valuable nurse time, and sometimes results in contamination of the sterile suture or the sterile inner pack due to a faulty transfer between the circulating nurse and the sterile nurse or the faulty deposition of the sterile suture on the sterile table.

According to the invention, an improved apparatus and package is provided for dispensing sterile objects sealed between a pair of flexible sterile strip surfaces of a continuous envelope. Each strip has a free end portion at one end of the envelope. The improved apparatus has a container adapted to contain the continuous envelope. The envelope is divided by spaced transverse seals into a plurality of compartments hermetically sealed off from one another and each of the compartments contains a sterile object. The container comprises first and second guide members spaced from one another to define a dispensing aperture between them and having outer guide surfaces on opposite sides of said aperture. The free end portions of the envelope and the envelope itself are adapted to be drawn through the aperture with the sterile objects in the sealed compartments. The free end portions of the strip then are separated and drawn in opposite directions over the outer surfaces of the first and second guide members respectively. When the first of the sealed compartments is drawn through the aperture the top and bottom sheet portions of this compartment also are separated from one another and drawn in opposite directions over the surfaces of the first and second guide members to expose the sterile object and the sterile inside surfaces of the envelope all around the sterile object.

The container with the envelope inside is adapted to be used both as a package for the sterile objects and as a dispensing unit for said objects. In addition, the container is adapted to be operated in conjunction with an automatic unit which may include foot actuatable means adapted to be connected to the container for dispensing sterile objects so that the operator may maintain both hands free and sterile for handling the sterile objects when dispensed.

For a better understanding of the present invention reference should be had to the accompanying drawings, wherein like numerals of reference indicate similar parts throughout the several views and wherein:

FIG. 1 is a perspective view of the apparatus for dispensing sterile objects showing the pedal side and the hinge side of the apparatus with the open position of the drive portion housing shown in dotted lines.

FIG. 2 is a view similar to FIG. 1 showing the back side and the latch side of the apparatus shown in FIG. 1.

FIG. 3 is a fragmentary side elevational view of the dispensing end of the cartridge housing and frame and showing the panel.

FIG. 4 is a horizontal sectional view taken along the line 4—4 of FIG. 5 in the direction of the arrows.

FIG. 5 is a vertical sectional view taken along the line 5—5 of FIG. 4 in the direction of the arrows.

FIG. 6 is a fragmentary vertical sectional view similar to FIG. 5 showing the drive portion housing in the open position.

FIG. 7 is a perspective view of a loaded suture cartridge.

FIG. 8 is a side elevational view of the suture cartridge shown in FIG. 7.

FIG. 9 is a fragmentary exploded view showing the position of the two half sections of the suture cartridge preparatory for assembly.

FIG. 10 is a fragmentary vertical sectional view taken along the line 10—10 of FIG. 9 in the direction of the arrows.

FIG. 11 is an end elevational view of the drive end of the suture container or cartridge taken along the line 11—11 of FIG. 8 in the direction of the arrows.

FIG. 12 is a fragmentary plan view of the continuously sealed multi-pouch strip.

FIG. 13 is a side elevational view of the strip shown in FIG. 12.

FIG. 14 is a vertical sectional view taken along the line 14—14 of FIG. 12 in the direction of the arrows.

FIG. 15 is a perspective view of a portion of the strip shown in FIG. 12.

FIG. 16 is a schematic wiring diagram of the drive means and control means for the dispensing apparatus.

FIG. 17 is a fragmentary plan view similar to FIG. 12 showing an alternative form of the strip.

FIGS. 18, 18a are fragmentary vertical sectional views similar to FIG. 5 showing an alternative form of the drive means.

FIG. 19 is a view similar to FIG. 11 showing another form of the drive means.

FIG. 20 is a view partly in section and partly in elevation of an alternative form of mechanical linkage eliminating the motor and for driving the sprocket normally associated with the motor.

FIG. 22 is a fragmentary view in elevation of an alternative form of mechanical linkage for driving the drive gear and fixed field clutch.

FIG. 21 is an alternative form of a drive means utilizing a pair of jaws movable from open to closed position and reciprocable along the path of movement of the strip.

Although the principles of the present invention are broadly applicable to apparatus for dispensing sterile objects, such as sterile sutures, sterile gloves, and the like, the present invention has been illustrated for use in conjunction with the dispensing of sterile sutures and hence will be so described.

With specific reference to the form of the present invention illustrated in the drawings, and referring to FIGS. 1 and 2, a suture dispenser is indicated generally by the reference numeral 10.

This suture dispenser 10 has a box-like frame 12 (FIGS. 1, 2) mounted on mobile casters 14 (FIGS. 1, 2), which frame 12 supports a cartridge housing 16 (FIGS. 1–6).

As shown in FIGS. 3–6, this cartridge housing 16 is provided with a top wall 18 (FIGS. 3, 5, 6), bottom wall 20 (FIGS. 3, 5, 6), side walls 22, 24 (FIGS. 3–5), a first horizontal shelf 26 (FIGS. 3, 5, 6), a second horizontal shelf 28 (FIGS. 3, 5, 6), and a center partition 30 (FIG. 3). These wall and partition members are disposed with respect to horizontal guide members 32 (FIGS. 3–6) to provide a plurality of, for example, twelve cartridge cavities $C_1$, $C_2$–$C_{12}$ (FIGS. 2, 3) in which are insertable cartridges $SC_1$, $SC_2$–$SC_{12}$ (FIGS. 2, 3).

Cartridge

Referring to FIG. 6, each cartridge $SC_1$, $SC_2$–$SC_{12}$, suitably of a transparent material such as Lucite, is fabricated in half sections 41a, 41b (FIGS. 7–11). Each half section 41a, 41b has opposed side walls 42 (FIGS. 7–10), with a top wall 48 (FIGS. 7, 8, 10, 11) and a bottom wall 50 (FIGS. 7, 8) disposed between such side walls 42 and formed to provide an aperture exit 52 (FIGS. 7, 8) and first and second strip guide portions or members 53 (FIGS. 7, 8) on one end and waste guide portions 55 defining an entrance 57 (FIG. 8) on the other end. The strip guide portions 53 present outer guide surfaces 53a extending perpendicularly away from the aperture 52 on either side of the aperture. Each half section 41a, 41b carries lap portions 43a, 43b (FIGS. 9, 10). The lap portion 43a is provided with a plurality of tabs 44 (FIGS. 7–9), which tabs 44 are registerable in pockets 45 in the top wall 48 of half section 41b (FIGS. 9–10). The half sections 41a, 41b are then secured together by an adhesive, such as epoxy resin.

A pair of shafts 54a (FIGS. 4, 5, 7–9, 11), 54b (FIGS. 4–8, 11) is journalled in the right-hand end portion, as viewed in FIGS. 7 and 8, of the side walls 42 and carry respectively the feed rolls 56a (FIGS. 4, 5, 7–9, 11), 56b (FIGS. 5–8, 11). The shaft 54b also carries a driven gear 58 (FIGS. 6–8, 11). Meshing gears 59a (FIGS. 7, 9), 59b (FIGS. 7, 9) on shafts 54a, 54b respectively interconnect the feed rolls 56a, 56b. A slidable reciprocal partition 60 (FIGS. 7, 8) divides the interior of the cartridge $SC_1$ into a suture cavity 62 (FIGS. 7, 8) and a waste cavity 64 (FIGS. 7, 8). Guides 65 (FIGS. 4, 5, 7, 11) on the dispensing end of the side walls 42 and guides 67 (FIGS. 7–9) on the waste end of the side walls 42 are provided for guiding such cartridges $SC_1$, $SC_2$–$SC_{12}$ into a cavity $C_1$, $C_2$–$C_{12}$. As shown in FIGS. 7 and 9, the guide 67 adjacent the driven gear 58 is provided with a clearance slot 69 for such driven gear 58.

A multiplicity of sterile sutures 70 on suture reels 70a are packaged individually in spaced compartments 68 in a continuous multi-compartment envelope 66, FIGS. 12–15. The envelope 66 comprises a flexible top sheet 66a and a flexible bottom sheet 66b heat sealed together along their respective overlapping edges by longitudinal edge seals 66c of appreciable width, and divided by spaced transverse seals 66d into the above referred to compartments. The suture reels 70a, in turn, are located centrally of the compartments 68. The top and bottom sheets 66a and 66b may be formed from an outer barrier layer of aluminum foil and an inner heat sealing layer such as a thermo-plastic vinyl coating, and the sheets are arranged with the heat sealing layers facing one another. The edge seals 66c and transverse seals 66d are such that each of the compartments is hermetically sealed from one another and from the surrounding atmosphere, but is capable of being stripped apart when it is desired to open the compartment to dispense the suture as will be described more fully hereinafter. Thus, the compartments are peripherally and hermetically sealed. The envelope comprises free end portions 72a and 72b (FIGS. 7, 8, 13) which normally are not sealed to one another. These free end portions act as leads for initially positioning the envelope in the cartridge so that it is ready to be drawn through the exit aperture 52 of the cartridge for dispensing sutures. More specifically, the envelope 66 is formed into an accordion shaped pile 66c (FIGS. 7 and 8) and loaded into the suture cavity 62 of the cartridge with the free ends 72a and 72b of the envelope projecting through the exit aperture 52 and then away from one another and perpendicularly over the guide surfaces 53a and then over and under the top wall 48 and the bottom wall 50 of the cartridge, respectively, and around the feed rolls 56a and 56b, and then through the nip between these feed rolls into the waste cavity 64 of the cartridge. The used end portions 72a and 72b of the envelope 66 are then accumulated in the waste cavity of the cartridge and the slidable partition 60 is adapted to move toward the dispensing aperture to accommodate the increased lengths of the used free end portions 72a and 72b as the yet unused and still hermetically sealed portion of the envelope 66 decreases in size due to the dispensing of the sutures 70. Thus the size of the suture cavity 62 decreases and that of the waste cavity 64 increases as the partition 60 moves toward the dispensing aperture 52.

In order to load a cartridge $SC_1$, $SC_2$–$SC_{12}$ into a cartridge cavity $C_1$, $C_2$–$C_{12}$, a drive housing portion 74 (FIGS. 1, 2, 4–6) of the cartridge housing 16 (pivoted or hinged on the cartridge housing 16 at 76, FIGS. 4 and 6, and latched to the cartridge housing 16 at 78, FIGS. 1, 2, 4, 6) is moved to the open position shown in dotted line in FIG. 1 and in solid line in FIG. 6. The cartridges $SC_1$, $SC_2$–$SC_{12}$ are then individually slid into a cavity $C_1$, $C_2$–$C_{12}$ from the right-hand end of such cavities $C_1$, $C_2$–$C_{12}$ (as viewed in FIG. 6) with the guides 65, 67 riding on the guide members 32 until such cartridge comes to rest against a cartridge stop 80 (FIGS. 4, 5). The hinged drive portion housing 74 is then swung from the open position (FIGS. 1, 9) to the latched position (FIGS. 4, 5) so that drive gears 82 (FIGS. 4, 5, 8) of the drive means (FIGS. 3–5) engage the driven gears 58 on the cartridges $SC_1$, $SC_2$–$SC_{12}$. A transparent panel 83 (FIG. 3) is then inserted into a slot 83a in the side wall 22 of the cartridge housing 16.

Drive means

The drive means (FIGS. 3–6) has the drive gears 82 mounted on shafts 84a (FIGS. 4–6), 84b (FIGS. 5, 6), 84c (FIGS. 5, 6) journalled in side walls 24a, 22a (FIGS. 4, 6) of the drive portion housing 74. One drive gear 82 and an associated clutch $88_1$, $88_2$–$88_{12}$, of the fixed field type are provided for each driven gear 58 and cartridge $SC_1$, $SC_2$–$SC_{12}$. Each fixed field type clutch $88_1$, $88_2$–$88_{12}$ is of the type manufactured by Simplatrol Products Corporation, Worcester, Massachusetts. A motor 90 (FIGS. 4, 5, 16) mounted on end plate 92 (FIGS. 4, 5) of the drive portion housing 74 drives the shafts 84b, 84c by means of a sprocket drive 94 (FIG. 5). Rotation is transmitted to shaft 84a by chain drive 96 (FIGS. 5, 6) from shaft 84b.

The motor 90 in the motor energization circuit (FIG. 16) is connected through a motor controller 97 to the power input leads $L_1$, $L_2$ (FIGS. 1, 2, 16). These input leads $L_1$, $L_2$ (having a manual switch 97a disposed in input lead $L_1$) are connected to a suitable source of power indicated in FIG. 16 by the legend "AC supply."

It will be understood by those skilled in the art that one or more of the suture cartridges $SC_1$, $SC_2$–$SC_{12}$ in the cartridge cavities $C_1$, $C_2$–$C_{12}$ may be provided with sutures 70 of varying sizes and length and the apparatus of the present invention is capable of presenting the desired or selected suture 70 by operation of the control means.

Control means

In order for the operator (i.e. sterile nurse) to automatically have presented to her a desired sterile suture 70 of a predetermined size and length, the operator, or sterile nurse, pushes a starting pedal 98a (FIG. 1) mounted on a pedal board 100 hinged at 102 on the front panel of the frame 12 (FIG. 1). Depression of the starting pedal 98a, which is attached to the operating arm of a starting switch 104 (FIG. 16), closes the clutch operating circuit (shown in FIG. 16) of the control means.

In FIG. 16, the power lead-in lines $L_1$ and $L_2$ extend to a clutch rectifier 106. One side of the clutch rectifier 106 is connected through the starting switch 104 to rotary portion 107 of a first deck 108 of a bi-directional circuit selector or stepping relay 110 of the type manufactured by Ledex Incorporated, Dayton, Ohio. The other side of the clutch rectifier 106 is connected to the coils $112_1$, $112_2$–$112_{12}$ of the clutches $88_1$, $88_2$–$88_{12}$ respectively (with a signal light 114, $114_2$–$114_{12}$ respectively in parallel therewith) to the stationary portion 115 of the first deck 108.

Operation

If, for example, the sterile nurse wishes to be presented with a suture from suture cartridge $SC_4$ (FIG. 2), she could depress forward pedal 98c (FIG. 1) thus closing forward switch 116 (FIG. 16) with attendant energization of the forward solenoid 118 and resultant rotation (in a clockwise direction) by means of indexing linkage 118a of the rotary portion 107 of the first deck 108 of the stepping relay 110 from position "9" to position "4." Each time the sterile nurse depresses the forward pedal 98c, this rotary portion 107 of the first deck 108 is indexed in clockwise direction one position until such rotary portion 107 arrives at position "4" thus energizing the coil $112_4$ of the clutch $88_4$ and causing illumination of the light $114_4$.

Then, energization of the coil $112_4$ through the starting foot pedal 98a causes the clutch $88_4$ (FIGS. 4, 5) to grip the shaft 84a so that the associated drive gear 82 rotates the driven gear 58 of suture cartridge $SC_4$, thereby rotating the feed rolls 58a, 58b and causing the presentment of a suture 70 (FIGS. 2, 8) to the sterile nurse. The suture 70 is presented as the feed rolls 58a and 58b cause the flexible sheets to separate further and draw the next sealed compartment 68 through the exit, or dispensing, aperture 52. At this point, the top and bottom sheet portions 66a and 66b of this next compartment are separated from one another to open the compartment and expose the sterile suture contained therein. This is done by drawing the sheet portions 66a and 66b oppositely away from one another and roughly perpendicular to the plane of the envelope 66 passing through the aperture 52 and over the guide surfaces 53a of the first and second guide members at the end of the cartridge. This, in turn, exposes the sterile inside surfaces of the sheets 66a and 66b all around the exposed suture reel 70a and suture 70, which at this point is protruding through the exit aperture 52, as shown in FIG. 7. It will be seen that, in FIG. 7, the sterile inside surfaces of the sheets 66a and 66b are exposed, not only above and below the suture, but to the right and to the left of the suture reel 70a, thereby presenting the suture 70 and its reel 70a from an entirely sterile field surrounding the reel, as shown clearly in FIG. 7. This allows the sterile nurse to grasp the suture reel 70a without fear of contacting non-sterile surfaces adjacent the suture. More importantly, perhaps, this sterile field surrounding the suture reel 70a allows the suture to be removed from the cartridge without danger of its contacting any non-sterile surface which would contaminate the suture or the reel.

As indicated above, the apparatus of this invention may be operated by the foot of the operator thereby leaving both hands free and sterile for handling the suture. In this embodiment of the invention, the amount by which the suture reel 70a protrudes from the exit aperture 52 is controlled by the extent to which the operator energizes the starting foot pedal 98a. In other words, the feed rolls 58a and 58b operate to draw the sheets 66a and 66b around the cartridge for as long as the apparatus is energized through the starting foot pedal 98a. When this starting foot pedal is de-energized then the feed rolls 58a and 58b cease their rotation and the envelope 66 remains in whatever position it has reached with respect to the cartridge. It is an important feature of this invention that sutures may be dispensed automatically in the above described manner one at a time without disturbing the sterile packaging of the sutures remaining in the compartments of the envelope which have not yet reached the aperture 52 of the cartridge. Thus, the sutures remain readily available in sterile condition to be dispensed automatically at any time according to need.

Alternatively, the sterile nurse could have depressed the reversing pedal 98b (FIG. 1), thereby causing closure of the reversing switch 120 (FIG. 16), resultant energization of the reversing solenoid 122 and indexing movement by means of indexing linkage 122a of the rotary portion 123 of a second deck 124 of the stepping relay 110. With each depression of such reversing pedal 98b, the rotary portion 123 of the second deck 124 of the stepping relay 110, moves one position in counterclockwise position (FIG. 16) from position "9" until it arrives in the desired position "4," as indicated by the lighting of signal light $114_4$.

It will be noted from FIG. 16 that the forward solenoid 118 and reversing solenoid 122 in the solenoid circuit are connected through a rectifier 126 to power input lines $L_1$, $L_2$.

In both the forward and reversing branches of the solenoid circuit, each solenoid 118, 122 is connected in series with a normally closed contact 130, which contact 130 is disposed in parallel with a resistor 132. Both the contact 130 and the forward solenoid 118 and contact 130 and the reversing solenoid 122 are disposed in parallel with a condenser 134.

Alternative embodiments

It will be understood by those skilled in the art that alternatively other sterile objects, such as sterile gloves (not shown), may be dispensed by the apparatus of the present invention. Further, the pair of thin metal webs 66a, 66b (FIGS. 12–14) may be replaced by a single web $66_{17}$ (FIG. 17) having a width twice the width of the webs 66a, 66b, which wider web $66_{17}$ is then folded longitudinally and sealed on all sides to form the pouch $68_{17}$ (FIG. 17).

Furthermore, the motor 90 may be eliminated and the apparatus of this invention may be operated directly by a chain 94c passing around a guide sprocket 94e and connected to a linkage 94f which, in turn, is driven by the foot pedal 98a (FIG. 1). The chain 94c may drive the apparatus, either through the sprocket 94b (FIG. 18) on the shaft 94a, or through one of the gears 82 (FIG. 18a). In the first case, the chain 94c is attached to the driven end of a one way Sprague clutch 201 at 94d and the shaft 94a is driven only in one direction by the driving end of the Sprague clutch. In the second case, the chain 94c drives the gear 82 on the second tier of the apparatus, referring to FIGS. 4 and 5, through the Sprague clutch 201 which, in turn, is attached to the chain 94c at 94d, as described hereinbefore in connection with FIG. 18. Again, the driving end of the clutch 201 drives the gear 82 in the second tier only in one direction, and the gears 82 in the first and third tiers of the apparatus are driven by chain drives connected to the second tier (FIG. 18a).

As shown in FIG. 19, the driven gear 58 of the cartridge container $SC_1$, $SC_2$–$SC_{12}$ may be eliminated and a manual handle 136 added to the shaft 54b for manual operation of cartridge container $SC_1$, $SC_2$–$SC_{12}$.

In FIG. 20, rack 138 carried by a rod 140 is reciprocable in a guide 142 (as indicated by the arrows in FIG. 20) against the biasing action of a spring 144. Such rod 140 is connected by a lever 146 to the pedal 98a. This reciprocable movement of the rack 138 is limited by stops 148 and 150 positioned as desired on the rod 140 and guide 142, respectively. As shown in FIG. 20, the rack 138 drives a gear 152 on the shaft 94a, which shaft 94a also carries the sprocket 94b (not shown in FIG. 20).

In FIG. 22, the rack 138 drives a gear 154 on the shaft 84c which also carries the drive gear 82 (not shown in this figure).

It will be recognized by those skilled in the art that the apparatus of the present invention has achieved the advantage of providing a simple, rugged, efficient dispenser of sterile objects. Such improved apparatus substantially eliminates valuable nurse hours in the operating room, eliminates sterile object waste, and insures the deposition of a sterile object on the sterile table.

While in accordance with the patent statutes, preferred and alternative embodiments of the present invention have been illustrated and described in detail, it is to be particularly understood that the invention is not limited thereto or thereby.

What is claimed is:

1. Apparatus and package for dispensing sterile objects which comprises a continuous envelope divided by spaced transverse seals into a plurality of compartments hermetically sealed off one from the other, a sterile object located in each of said compartments, said envelope comprising top and bottom sterile flexible inside sheet surface portions normally attached to one another so as to provide hermetically sealed edges along the respective longitudinal borders of each compartment and having free end portions normally unattached to one another, a container for accommodating said envelope and dispensing the sterile objects, said container comprising first and second guide members spaced from one another to define a dispensing aperture between them and having outer guide surfaces on opposite sides of said aperture, and means associated with said container for engaging the free end portions of said envelope and pulling them through said dispensing aperture and then drawing the free end portions of said envelope away from one another and over the outer surfaces of said first and second guide members respectively until the first of said compartments is drawn through said aperture at which point the top and bottom sheet portions of said first compartment are separated from one another to expose the sterile object contained therein and the separated sheet portions of said first compartment are drawn over the outer surfaces of said first and second guide members respectively to expose the sterile inside surfaces of said sheet portions all around the exposed sterile object, a waste aperture is provided at the end of the container opposite to the dispensing aperture and the used free end portions of said envelope are adapted to be fed into said container through said waste aperture and the yet unused and still hermetically sealed portion of said envelope inside said container is separated from the used free end portions of said envelope in said container by partition means movable towards and away from said dispensing aperture to accommodate the increased lengths of said free end portions as they are fed into said container through said waste aperture.

2. Apparatus for dispensing sterile objects sealed between a pair of sterile flexible strip surfaces of a continuous envelope, each strip surface having a free end portion, said apparatus comprising:
   (a) a container adapted to contain said envelope,
       (1) said container comprising first and second guide members spaced from one another to define a dispensing aperture between them and having outer guide surfaces on opposite sides of said aperture, and comprising exterior surfaces beyond said outer guide surfaces,
       (2) said free end portions being separable after emergence from said dispensing aperture,
   (b) at least one waste guide aperture connecting said exterior surfaces of the container with the interior of said container,
   (c) drive means on said container and operable to engage said free end portions of said envelope and draw them through said aperture and away from one another to separate said free end portions and then draw them over the outer surfaces of said first and second guide members and thence over the exterior surfaces of said container and through said waste guide aperture, or apertures, into the interior of said container.

3. The apparatus recited in claim 2, wherein said container is provided with a cavity for said envelope, and having movable partition means in said cavity for separating said envelope from said free end portions.

4. The apparatus recited in claim 2, wherein said drive means comprises a pair of feed rolls.

5. The apparatus recited in claim 2, wherein said drive means is remotely operable by foot so that the operator may maintain both hands free and sterile for handling the sterile object.

6. The apparatus recited in claim 5, wherein said drive means comprises feed rolls and foot actuated linkage means connected to said feed rolls.

7. Apparatus for dispensing a selected sterile object from a first group of sterile objects and a second group of sterile objects, said first group of sterile objects being sealed between a first pair of sterile flexible strip surfaces of a first continuous envelope and each first strip surface having a first free end portion, said second group of sterile objects being sealed between a second pair of sterile flexible strip surfaces of a second continuous envelope and each second strip surface having a second free end portion, said apparatus comprising:
   (a) a frame provided with a first container cavity and a second container cavity,
   (b) a first container and a second container disposed in said first container cavity and said second container cavity respectively and adapted to contain said first envelope and said second envelope respectively,
       (1) said first container being provided with a first discharge means on one portion thereof for said first free end portions and said first envelope,
       (2) said first free end portions being separable after emergence from said first discharge means,
       (3) said second container being provided with a second discharge means on a first portion thereof for said second free end portions and said second envelope,
       (4) said second free end portions being separable after emergence from said second discharge means.
   (c) a first drive means on another portion of said first container and operable to engage said first free end portions,
   (d) a second drive means on another portion of said second container and operable to engage said second free end portions, and
   (e) control means on said frame operatively associated with said first and second drive means for actuating a selected one of the first and second drive means as desired to deliver said selected sterile object,
       (1) said selected one of said first and second drive means being operable to advance the said selected one of the first and second envelopes through the selected one of the said first and second discharge means to expose said selected sterile object and the selected sterile surfaces of said selected one of said first and second envelopes adjacent said selected sterile object.

8. The apparatus recited in claim 7 and having container guide means in said first container cavity.

9. The apparatus recited in claim 7 and having stop means in said first container cavity.

10. The apparatus recited in claim 7, wherein said first drive means has feed roll means for engaging said first free end portions, gear means connected to said feed roll means, a motor, and clutch means associated with said gear means and said motor for actuating said gear means.

11. The apparatus recited in claim 7, wherein said control means has stepping relay means connected to said first drive means and said second drive means, said stepping relay means being operable to actuate said selected one of said first drive means and said second drive means.

12. The apparatus recited in claim 7, wherein said first drive means has first clutch means, said second drive means has second clutch means and said control means has stepping relay means connected to said first clutch means and said second clutch means, said stepping relay means being operable to energize the selected one of said first clutch means and said second clutch means and thereby actuate said selected one of said first drive means and said second drive means.

13. Apparatus for individually dispensing thin elements such as sutures and the like, comprising in combination a housing having a slot formed therein through which the elements may pass; a container unit for holding a pair of superimposed, flexible, separably connected strips between which a plurality of the elements are inserted in longitudinally spaced relation; said unit including guide means between which said strips are movable as a unit, and including further first actuating means operable to move said strips as a unit through said guide means and to separate said strips whereby the elements are successively fed through said guide means; said housing having further a second actuating means interconnected for operation with a foot pedal mounted externally said housing at the front and base thereof; and said unit retractably inserted into said housing and supported therein, wherein a portion of said guide means is placed adjacent said slot, and said first and second actuating means coact such that operation of said second actuating means results in the successive feeding of the elements through said slot toward the outside of said housing.

14. Apparatus for individually dispensing thin elements such as sutures and the like, comprising in combination a housing having a slot formed therein through which the elements may pass, and having further a guide track device therein in association with said slot; a container unit for holding a pair of superimposed, flexible, separably connected strips between which a plurality of the elements are inserted in longitudinally spaced relation; said unit including guide means between which said strips are movable as a unit, and including further first actuating means operable to move said strips as a unit through said guide means and to separate said strips whereby the elements are successively fed through said guide means; said housing including further a second actuating means mounted therein and which is operable from outside said housing; and said unit being adapted to cooperate with said guide track device when retractably inserted into said housing for placing a portion of said guide means adjacent said slot and said first actuating means in cooperable relation with said second actuating means, whereby operation of said second actuating means results in the elements being successively fed outwardly through said slot.

15. Apparatus for individually dispensing thin elements such as sutures and the like, comprising in combination a housing having a slot formed therein through which the elements may pass and having further a guide device therein and associated with said slot; a container unit for holding a pair of superimposed, flexible, separably connected strips between which a plurality of the elements are inserted in longitudinally spaced relation; said unit including guide means between which said strips are movable as a unit, and including further first actuating means operable to move said strips as a unit through said guide means and to separate said strips whereby the elements are successively fed through said guide means; said housing having further a second actuating means mounted therein and operable from outside said housing; and said unit being adapted to cooperate with said guide device when retractably inserted into said housing on said guide device with said first actuating means placed in cooperable relation with said second actuating means, whereby operation of said second actuating means results in the elements being successively fed outwardly through said slot; said unit being inserted into said housing such that a portion of said guide means extends through said slot so as to protrude outwardly therefrom, whereby upon operation of said actuation means the inner, formerly enclosed surfaces of said strips are exposed externally of said housing, with the outer, exposed surfaces of said strips removed from external exposure, said strips being guided back into said housing.

References Cited
UNITED STATES PATENTS

| | | | |
|---|---|---|---|
| 661,130 | 11/1900 | Pape | 221—25 |
| 895,527 | 8/1908 | Williams | 221—25 |
| 962,030 | 6/1910 | Kirkegaard | 221—277 |
| 2,465,876 | 3/1949 | Hornung | 221—25 |
| 2,634,857 | 4/1953 | Weckesser | 206—63.2 |
| 2,650,149 | 8/1953 | Muntz et al. | 221—31 X |
| 3,047,347 | 7/1962 | Groves | 221—25 X |
| 3,154,216 | 10/1964 | Snow et al. | 221—259 X |

WALTER SOBIN, *Primary Examiner.*